US012719077B2

(12) United States Patent
Li et al.

(10) Patent No.: US 12,719,077 B2
(45) Date of Patent: Aug. 25, 2026

(54) ELECTRODE SHEET AND BATTERY CELL

(71) Applicant: Ningde Amperex Technology Limited, Ningde (CN)

(72) Inventors: Xiang Li, Ningde (CN); Huixin Wang, Ningde (CN); Qiaoshu Hu, Ningde (CN); Yibo Zhang, Ningde (CN)

(73) Assignee: Ningde Amperex Technology Limited, Ningde City (CN)

( * ) Notice: Subject to any disclaimer, the term of this patent is extended or adjusted under 35 U.S.C. 154(b) by 35 days.

(21) Appl. No.: 18/484,615

(22) Filed: Oct. 11, 2023

(65) Prior Publication Data

US 2024/0039033 A1 Feb. 1, 2024

Related U.S. Application Data

(62) Division of application No. 16/718,852, filed on Dec. 18, 2019, now Pat. No. 11,817,543.

(30) Foreign Application Priority Data

May 21, 2019 (CN) ......................... 201910422550.5

(51) Int. Cl.
*H01M 50/538* (2021.01)
*H01M 10/04* (2006.01)
*H01M 50/534* (2021.01)
*H01M 50/536* (2021.01)
*H01M 50/54* (2021.01)

(52) U.S. Cl.
CPC ..... *H01M 10/0431* (2013.01); *H01M 50/534* (2021.01); *H01M 50/536* (2021.01); *H01M 50/538* (2021.01)

(58) Field of Classification Search
None
See application file for complete search history.

(56) References Cited

U.S. PATENT DOCUMENTS

2007/0117011 A1* 5/2007 Myerberg ............. B32B 15/017 428/615
2009/0029240 A1* 1/2009 Gardner ............. H01M 50/538 429/211

(Continued)

FOREIGN PATENT DOCUMENTS

CN 1921180 A 2/2007
CN 202094228 U 12/2011

(Continued)

OTHER PUBLICATIONS

English translation of CN 106257710 (Year: 2016).*

(Continued)

*Primary Examiner* — Yoshitoshi Takeuchi
(74) *Attorney, Agent, or Firm* — Maier & Maier, PLLC

(57) ABSTRACT

A battery cell includes an electrode sheet. The electrode sheet includes an electrode sheet body and a plurality of tabs connected to the electrode sheet body. The width of each of the plurality of tabs is different from one another; or the length of each of the plurality of tabs is different from one another. The electrode sheet and the battery cell having the electrode sheet ensures that each of the tabs in the electrode sheet can electrically conduct well with the tab lead. Thus, the battery cell has the advantage of good electrical conductivity.

7 Claims, 6 Drawing Sheets

(56) References Cited

U.S. PATENT DOCUMENTS

| | | | | |
|---|---|---|---|---|
| 2016/0218343 | A1* | 7/2016 | Kim | H01M 10/0587 |
| 2018/0198132 | A1* | 7/2018 | Liang | H01M 4/663 |
| 2023/0216077 | A1* | 7/2023 | Wen | H01M 10/0409 429/209 |

FOREIGN PATENT DOCUMENTS

| | | | | | |
|---|---|---|---|---|---|
| CN | 105552432 | A | | 5/2016 | |
| CN | 106058137 | A | * | 10/2016 | H01M 10/0525 |
| CN | 106257710 | | * | 12/2016 | H01M 10/0525 |
| CN | 106257710 | A | | 12/2016 | |
| CN | 106960976 | A | | 7/2017 | |
| CN | 107221676 | | * | 9/2017 | H01M 4/64 |
| CN | 107221676 | A | | 9/2017 | |
| CN | 108461811 | A | * | 8/2018 | H01M 10/0525 |
| CN | 207765532 | U | * | 8/2018 | |
| CN | 207818739 | U | | 9/2018 | |
| CN | 108682790 | A | | 10/2018 | |
| CN | 110061182 | A | | 7/2019 | |
| CN | 114094288 | A | * | 2/2022 | |
| CN | 113097570 | B | * | 8/2022 | G01B 11/022 |
| JP | 2013098026 | A | | 5/2013 | |
| JP | 5784928 | B2 | | 9/2015 | |
| JP | 2016/115422 | | * | 6/2016 | H01M 10/04 |
| WO | WO-2023123274 | A1 | * | 7/2023 | H01M 10/0431 |
| WO | WO-2024087957 | A1 | * | 5/2024 | |

OTHER PUBLICATIONS

English translation of CN 107221676 (Year: 2017).*
English translation of JP 2016/115422 (Year: 2016).*
English translation of CN-108461811 (Year: 2018).*
English translation of WO 2023123274 (Year: 2023).*
English translation of WO 2024087957 (Year: 2025).*
English translation of CN 113097570 (Year: 2022).*
English translation of CN 114094288 (Year: 2022).*
English translation of CN 207765532 (Year: 2018).*
English translation of CN 106058137 (Year: 2016).*
Chinese First Office Action issued Jan. 21, 2020 in Chinese counterpart application 201910422550.5, 13 pages in Chinese.
PCT International Search Report in the International application No. PCT/CN2020/071171, 5 pages in English.
PCT Notification of transmittal of International Search Report and Written Opinion in International Application No. PCT/CN2020/071171 issued Mar. 23, 2020, 5 pages in English.

* cited by examiner

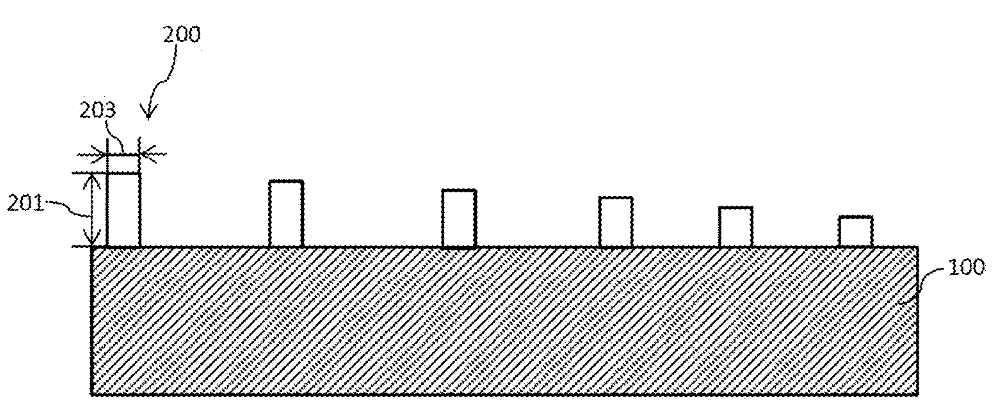
FIG. 1
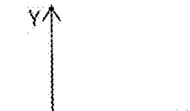

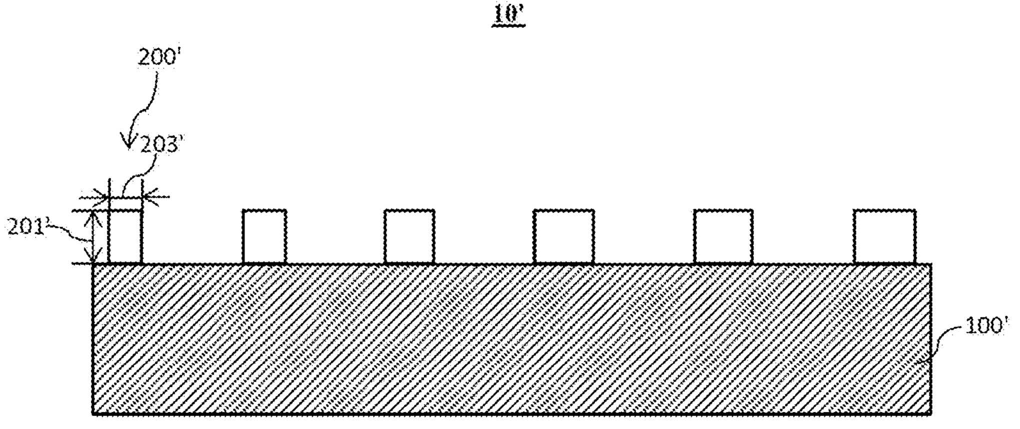
FIG. 4
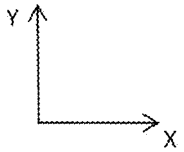

ELECTRODE SHEET AND BATTERY CELL

CROSS REFERENCE TO RELATED APPLICATIONS

The present application is a Divisional application of U.S. patent application Ser. No. 16/718,852, filed on Dec. 18, 2019, which claims the benefit of priority from the Chinese Patent Application No. 201910422550.5, filed on May 21, 2019, the disclosures of which are hereby incorporated by reference in its entirety.

BACKGROUND

1. Technical Field

The embodiments of the present application relate to the field of batteries, and more particularly to an electrode sheet and a battery cell.

2. Background

Lithium-ion batteries have been widely used in electronic products and electric vehicles due to their high specific energy, high working voltage, low self-discharge rate, small size, light weight and other advantages. As the market demands for battery safety continue to improve, it is not only necessary to ensure that there are no potential safety hazards when the battery is normally used, but also to ensure that the battery does not ignite, burn or explode after being subjected to various damages such as severe impact and puncture.

The current collectors used in the conventional lithium-ion batteries are typically metal foils including copper foil, aluminum foil, nickel foil, etc. for achieving electron conduction. However, the safety performance of such a lithium-ion battery is not high enough to meet increasingly stringent market requirements. To improve the safety performance of the lithium-ion battery while reducing the weight of the battery, a composite current collector including a polymer layer and metal layers located on the surfaces of the polymer layer is adopted to implement the electron conduction. However, since the electrons between the two surfaces of the metal layers of the composite current collector are not conductive, the conventional conducting structure formed by welding the multi tabs cannot be used for electron conduction between the inner multi tabs and the tab lead.

Therefore, for the lithium-ion battery using the composite current collector, an appropriate battery structure is required in the industry to meet an electron conduction requirement of a battery tab.

SUMMARY

One of the objectives of the embodiments of the present application is to provide an electrode sheet and a battery cell. While improving the safety performance of the cell, the special design of the tabs of the electrode sheet enables each tab to be well electrically connected to a tab lead.

An electrode sheet provided according to an embodiment of the present application includes an electrode sheet body, and a plurality of tabs connected to the electrode sheet body. Wherein the electrode sheet has a length direction and a width direction perpendicular to the length direction. Each of the plurality of tabs has a width in the width direction and a length in the length direction. The width of each of the plurality of tabs is different from one another; or the length of each of the plurality of tabs is different from one another.

In some embodiments of the present application, the widths of the plurality of tabs are sequentially configured in the length direction according to a first arithmetic progression; or the lengths of the plurality of tabs are sequentially configured in the length direction according to a second arithmetic progression.

In some embodiments of the present application, the electrode sheet body includes a current collector and an active material layer located on a surface of the current collector. The current collector includes a first polymer layer and a first metal layer located on a surface of the first polymer layer.

In some embodiments of the present application, each of the plurality of tabs includes a second polymer layer and a second metal layer located on the surface of the second polymer layer.

In some embodiments of the present application, the surface of the second polymer layer includes a first surface and a second surface, the first surface being provided with the second metal layer and the second surface being not provided with the second metal layer.

A battery cell provided according to another embodiment of the present application includes an electrode assembly formed by winding a first electrode sheet and a second electrode sheet. The first electrode sheet and the second electrode sheet are spaced apart from each other. An isolation film is sandwiched between the first electrode sheet and the second electrode sheet. The first electrode sheet includes an electrode sheet body, having a length direction and a width direction perpendicular to the length direction; and a plurality of tabs connected to the electrode sheet body, each of the plurality of tabs having a width in the width direction and a length in the length direction. The width of each of the plurality of tabs is different from one another. The plurality of tabs of the first electrode sheet include a first tab unit and a second tab unit, the second tab unit extends beyond the first tab unit in the width direction of the battery cell.

A battery cell provided according to another embodiment of the present application includes an electrode assembly formed by winding a first electrode sheet and a second electrode sheet. The first electrode sheet and the second electrode sheet are spaced apart from each other. An isolation film is sandwiched between the first electrode sheet and the second electrode sheet. The first electrode sheet includes an electrode sheet body, having a length direction and a width direction perpendicular to the length direction; and a plurality of tabs connected to the electrode sheet body, each of the plurality of tabs having a width in the width direction and a length in the length direction. The length of each of the plurality of tabs is different from one another. The plurality of tabs of the first electrode sheet include a first tab unit and a second tab unit, the second tab unit extends beyond the first tab unit in the length direction of the battery cell.

According to the electrode sheet and cell provided in the embodiments of the present application, the safety performance of the cell is improved, meanwhile, the weight of the battery is reduced, and good electrical conduction between each tab of the electrode sheet and the device using the cell is ensured.

BRIEF DESCRIPTION OF THE DRAWINGS

The accompanying drawings required by description about the embodiments of the present application or the prior art will be briefly described below to describe the embodiments of the present application. It is apparent that the accompanying drawings described below are only part of embodiments in the present application. For those skilled in the art, the accompanying drawings of other embodiments can still be obtained according to the structures illustrated in the accompanying drawings without any creative effort.

FIG. 1 shows a structure diagram of an electrode sheet according to an embodiment of the present application.

FIG. 4 shows a structure diagram of an electrode sheet according to another embodiment of the present application.

DETAILED DESCRIPTION

Figure 2:
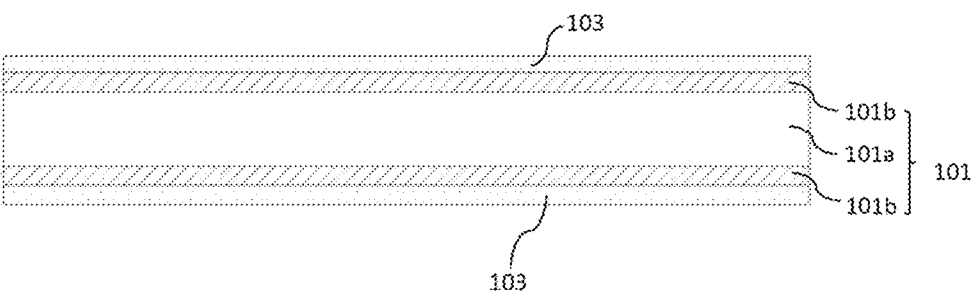
FIG. 2 shows a partial sectional view of an electrode sheet body in the embodiment shown in FIG. 1.

Embodiments of this application are described below in detail. Throughout the entire specification of this application, same or similar components or components having same or similar functions are represented by using similar reference numerals. The embodiments related to the accompanying drawings that are described herein are illustrative and schematic, and are used to provide basic understanding for this application. The embodiments of this application should not be construed as limitations to this application.

In this specification, unless otherwise particularly indicated or limited, relativistic wordings such as “central”, “longitudinal”, “lateral”, “front”, “back”, “right”, “left”, “inner”, “outer”, “relatively low”, “relatively high”, “horizontal”, “vertical”, “higher than”, “lower than”, “above”, “below”, “top”, “bottom”, and derived wordings thereof (such as “horizontally”, “downward”, and “upward”) should be construed as referenced directions described in discussion or shown in the accompanying drawings. These relativistic wordings are merely for ease of description, and require constructing or operating this application in a particular direction.

As used in this application, terms “about”, “roughly”, “substantially”, “essentially”, and “approximately” are used for describing and explaining a small variation. When being used in combination with an event or a case, the terms may refer to an example in which the event or case exactly occurs, or an example in which the event or case similarly occurs. For example, when being used in combination with a value, the terms may refer to a variation range being less than or equal to ±10% of the value, for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, if a difference between two values is less than or equal to ±10% of an average value of the values (for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%), it could be considered that the two values are “substantially” the same or “approximate”.

Furthermore, in order to facilitate description, “first”, “second”, “third” and the like may be used herein for distinguishing different components of one figure or a series of figures. “First”, “second”, “third” and the like are not intended to describe corresponding components.

In the present application, otherwise specifically assigned or limited, “dispose”, “connect”, “couple”, “fix” and words similar to them are wide in use, and those skilled in the art may understand the above words according to specific conditions, such as, fixed connection, detachable connection or integrated connection; it may also be mechanical connection or electrical connection; it may also be direct connection or indirect connection through an intermediary structure; and it may also be inner communication of two components.

FIG. 1 shows a structure diagram of an electrode sheet 10 according to an embodiment of the present application. As shown in FIG. 1, the electrode sheet 10 according to an embodiment of the present application includes an electrode sheet body 100 and a plurality of tabs 200 connected to the electrode sheet body 100.

The electrode sheet body 100 has a length direction X and a width direction Y perpendicular to the length direction X.

FIG. 2 shows a partial sectional view of the electrode sheet body 100 in the embodiment shown in FIG. 1. As shown in FIG. 2, the electrode sheet body 100 includes a current collector 101 and active material layers 103 located on the surfaces of the current collector 101. The current collector 101 includes a polymer layer 101*a* and metal layers 101*b* located on the surfaces of the polymer layer 101*a*.

The material of the polymer layer 101*a* may be selected from one or more of the group consisting of polyethylene terephthalate (PET), polybutylene terephthalate, polyethylene naphthalate, polyether-ether-ketone, polyimide, polyamide, polyethylene glycol, polyamide-imide, polycarbonate, cyclic polyolefin, polyphenylene sulfide, polyvinyl acetate, polytetrafluoroethylene, polymethylene naphthalene, polyvinylidene fluoride (PVDF), polyethylene naphthalate, polypropylene carbonate, poly(vinylidene fluoride-hexafluoropropylene), poly(vinylidene fluoride-co-chlorotrifluoroethylene), organic silicon, vinylon, polypropylene, polyethylene, polyvinyl chloride, polystyrene, polyether nitrile, polyurethane, polyphenyl ether, polyester, polysulfone and derivatives thereof.

According to an embodiment of the present application, the polymer layer 101*a* may have appropriate porosity to reduce the weight of the electrode sheet 10, meanwhile enlarge the area of the current collector 101 to improve an electron transport path and increase the loading capacity of an active substance. If the porosity of the polymer layer 101*a* is too large, the two metal layers 101*b* on the surfaces of the polymer layer 101*a* may penetrate each other when the metal layers 101*b* are prepared on the surfaces of the polymer layer 101*a*, thereby causing positive and negative current collectors of the entire battery cell to be directly connected, and thus causing a failure of the battery cell. In the embodiment of the present application, the porosity of the polymer layer 101*a* ranges from about 0% to 50%. The thickness of the polymer layer 101*a* is larger than about 1 micron and smaller than about 20 microns, preferably about 4 microns to about 15 microns. The thickness of the polymer layer 101*a* is less than or equal to the thickness of a conventional current collector so as to help increase the energy density of the battery cell while ensuring relatively high mechanical strength.

The material of the metal layer 101*b* may be selected from one or more of the group consisting of Ni, Ti, Cu, Ag, Au, Pt, Fe, Co, Cr, W, Mo, Al, Mg, K, Na, Ca, Sr, Ba, Si, Ge, Sb, Pb, In, Zn and a composition thereof. The two metal layers

101*b* located on the upper surface and lower surface of the polymer layer 101*a* may be the same metal and composition thereof, and may also be different metals and compositions thereof. The metal layer 101*a* has appropriate porosity, which helps reduce the weight of the electrode sheet 10, meanwhile enlarge the area of the current collector 101 to improve the electron transport path and improve the loading capacity of the active substance. If the porosity of the metal layer 101*b* is too large, the pores in the metal layer 101*b* may be excessive, thereby reducing the electron conduction capability and affecting the electrical performance of the battery cell. In the embodiment of the present application, the porosity of the metal layer 101*b* ranges from about 0% to 50%. If the thickness of the metal layer 101*b* is too thin, the electron conductivity of the metal layer 101*b* will decrease, which affects the performance of the battery cell. If the thickness of the metal layer 101*b* is too thick, the production efficiency of the metal layer 101*b* is affected and meanwhile the total thickness of the current collector 101 is increased, which is unfavorable for improving the energy density of the battery cell. In the embodiment of the present application, the thickness of the metal layer 101*b* is larger than about 0.1 micron and smaller than about 10 microns, preferably about 0.5 micron to about 2 microns.

The ratio of the thickness of the polymer layer 101*a* to the thickness of the metal layer 101*b* is about 0.1 to 200. The metal layer 101*b* may be formed on the surface of the polymer layer 101*a* by use of a sputtering method, a vacuum deposition method, an ion electroplating method, a pulsed laser deposition method and other methods.

As shown in FIG. 1, each of the plurality of tabs 200 has a width 201 parallel to the width direction Y of the electrode sheet body 100 and a length 203 parallel to the length direction X of the electrode sheet body 100.

Figure 5:
FIG. 5 shows a partial structure diagram of a battery cell according to an embodiment of the present application.
Figure 5:
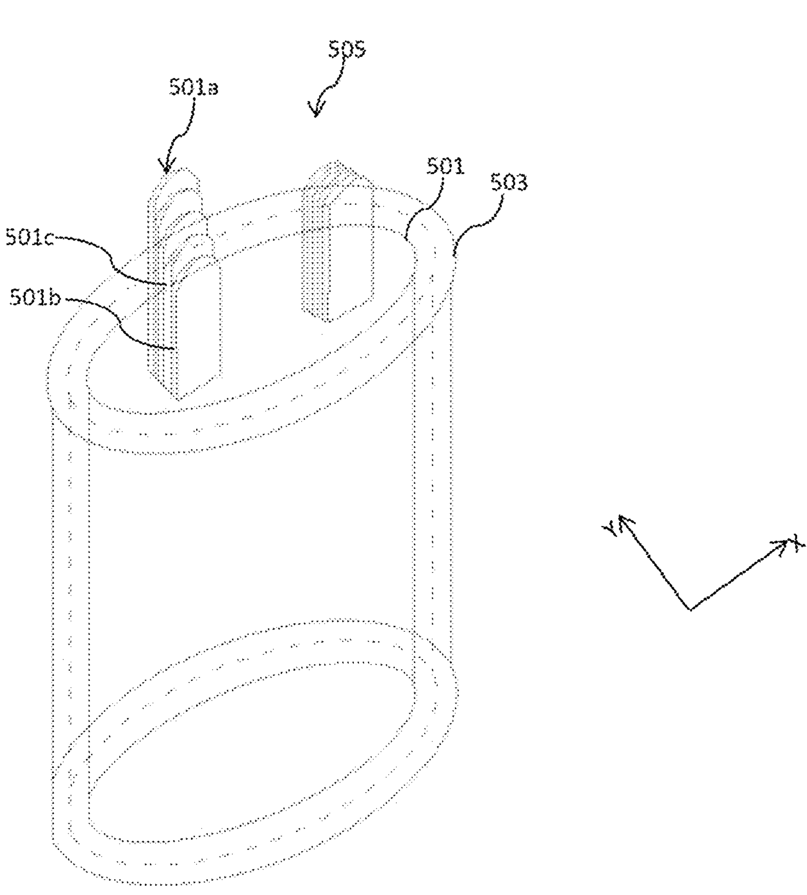

The width 201 of each tab 200 is different, the length difference between the widths 201 of every two adjacent tabs 200 is about 2 millimeters, and the interval between every two adjacent tabs 200 in the length direction X of the electrode sheet body 100 is designed such that each tab 200 may be stacked, as shown in FIG. 5, after the electrode sheet body 100 is wound into a wound structure in the length direction X. In some embodiments of the present application, the widths 201 of the plurality of tabs 200 may be sequentially configured in the length direction X of the electrode sheet body 100 according to an arithmetic progression. The difference value between the widths 201 of every two adjacent tabs may be about 0.1 millimeter to about 5.0 millimeters, preferably about 1.0 millimeter to about 2.0 millimeters. In some embodiments of the present application, the widths 201 of the plurality of tabs 200 may be freely set to different values in the length direction X of the electrode sheet body 100. Since the width 201 of each tab 200 is different, the edges being far away from the electrode sheet body 100, of the plurality of tabs 200 are not aligned after winding, such that each of the plurality of tabs 200 may be connected to a tab lead respectively in an appropriate manner.

In some embodiments of the present application, the intervals between the tabs 200 in the length direction X of the electrode sheet body 100 may be designed such that each tab 200 is not stacked after the electrode sheet body 100 is wound into the wound structure in the length direction X.

Figure 3:
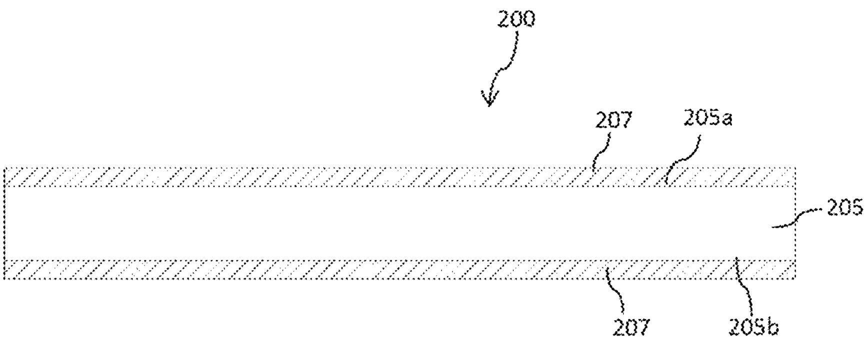
FIG. 3 shows a partial sectional view of a tab in the embodiment shown in FIG. 1.

FIG. 3 shows a partial sectional view of a tab 200 in the embodiment shown in FIG. 1. As shown in FIG. 3, each of the plurality of tabs 200 includes a polymer layer 205. The surface of the polymer layer 205 includes a first surface 205*a* and a second surface 205*b* opposite to the first surface 205*a*.

Metal layers 207 are arranged on the first surface 205*a* and the second surface 205*b*. In some embodiments of the present application, one of the first surface 205*a* and the second surface 205*b* is not provided with the metal layer 207.

Figure 8:
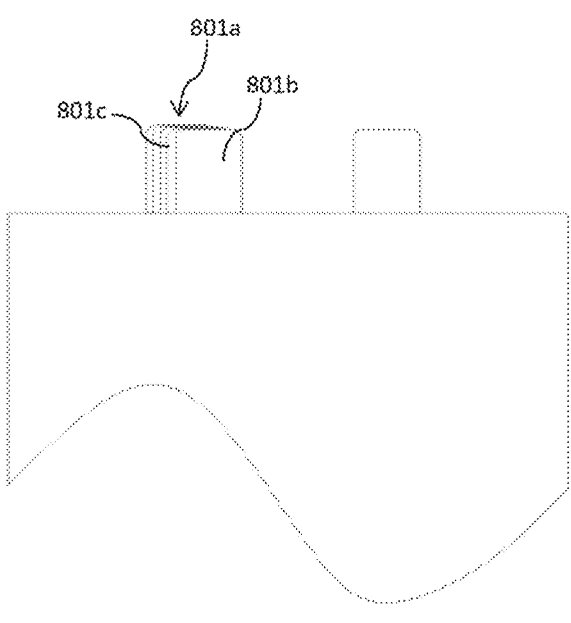
FIG. 8 shows a partial structure diagram of a battery cell according to another embodiment of the present application.

FIG. 4 shows a structure diagram of an electrode sheet 10' according to another embodiment of the present application. The difference from the electrode sheet 10 shown in FIG. 1 is that the width 201' of each tab 200' of the electrode sheet 10' has the same value and the length 203' of each tab 200' of the electrode sheet 10' has a different value. After an electrode sheet body 100' is wound into a wound structure in the length direction X, since the length 203' of each tab 200' is different, at least one of the edges where the two lengths 203' of the plurality of tabs 200' is not aligned after winding, such that each of the plurality of tabs 200' can be connected to the tab lead in an appropriate manner. In some embodiments of the present application, the lengths 203' of the plurality of tabs 200' are sequentially configured in the length direction X of the electrode sheet body 100' according to an arithmetic progression. For example, the difference value between the lengths 203' of every two adjacent tabs may be about 0.1 millimeter to about 5.0 millimeters, preferably about 1.0 millimeter to about 2.0 millimeters. In addition, the intervals between the tabs 200' in the length direction X of the electrode sheet body 100' are designed such that each tab 200' may be stacked, as shown in FIG. 8, after the electrode sheet body 100' is wound into the wound structure in the length direction X.

FIG. 5 shows a partial structure diagram of a battery cell 500 according to an embodiment of the present application. As shown in FIG. 5, the battery cell 500 includes an electrode assembly 505 formed by winding a first electrode sheet 501 and a second electrode sheet 503. The second electrode sheet 503 is spaced from the first electrode sheet 501. An isolation film is sandwiched between the first electrode sheet 501 and the second electrode sheet 503.

The first electrode sheet adopts the electrode sheet 10 in the embodiment shown in FIG. 1. Tabs 501*a* of the first electrode sheet 501 include a plurality of tab units. Taking a first tab unit 501*b* and a second tab unit 501*c* shown in FIG. 5 as an example, in the width direction Y of the battery cell 500, the dimension of the second tab unit 501*c* is larger than the dimension of the first tab unit 501*b*. In the electrode assembly 505, the first tab unit 501*b* and the second tab unit 501*c* are arranged in a stacking form. The other tabs 501*a* in FIG. 5 are configured in a manner similar to that of the first tab unit 501*b* and second tab unit 501*c* described above. In some embodiments of the present application, the intervals between the tabs 501*a* in the length direction X of the electrode sheet body 100 are designed such that the first tab unit 501*b* and the second tab unit 501*c* are arranged in a non-stacking form in the electrode assembly 505 after the electrode sheet body 100 is wound into the wound structure in the length direction X.

Figure 6:
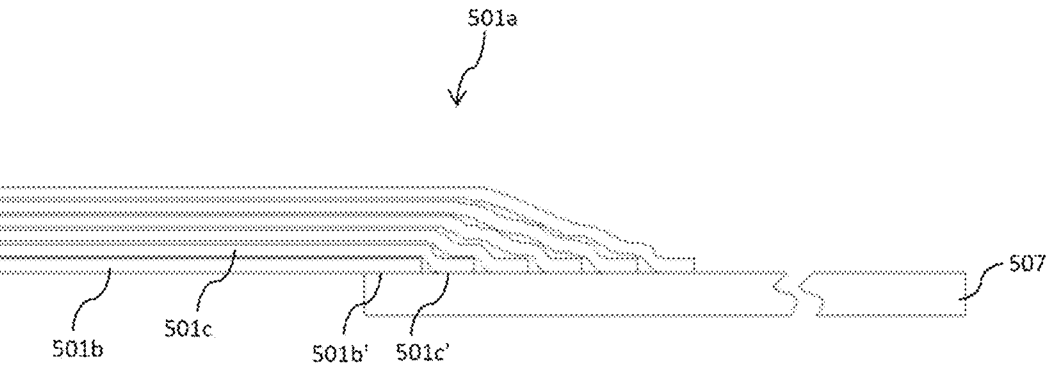
FIG. 6 shows another partial structure diagram of the battery cell according to the embodiment shown in FIG. 5.

FIG. 6 shows another partial structure diagram of the battery cell 500 according to the embodiment shown in FIG. 5. As shown in FIG. 6, the first tab unit 501*b* of the first electrode sheet 501*a* is electrically connected to a tab lead 507 through a first region 501*b*', and the second tab unit 501*c* of the first electrode sheet 501 is electrically connected to the tab lead 507 through a second region 501*c*'. The first region 501*b*' is closer to a main body of the electrode assembly 505 than the second region 501*c*'. Each of the tabs 501*a* of the first electrode sheet 501 shown in FIG. 5 may be welded to the tab lead 507 in welding manner such as ultrasonic welding, braze welding and rivet welding. Of course, the embodiments of the present application are not limited to the welding manner, and for example, the tabs 501*a* may be connected to the tab lead 507 in any appropriate manner such as a conductive adhesive.

Figure 7:
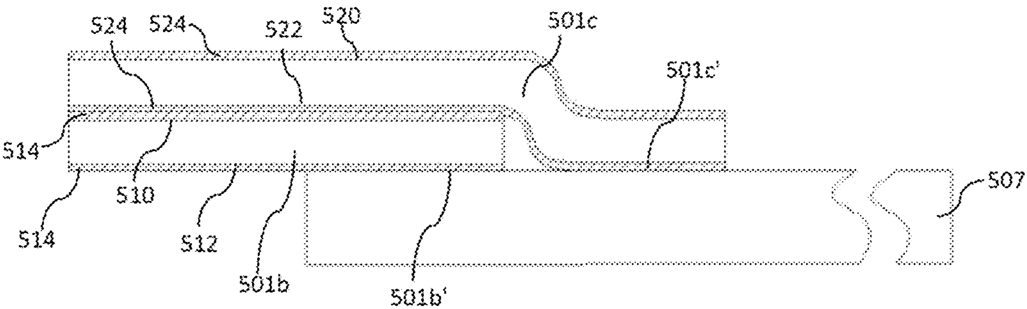
FIG. 7 shows a partial enlarged view showing the connection of the tab units and the tab lead of the embodiment shown in FIG. 5.

FIG. 7 shows a partial enlarged view showing the connection of the tab units and the tab lead of the embodiment shown in FIG. 5. As shown in FIG. 7, the first tab unit 501*b* of the first electrode sheet 501 is electrically connected to the tab lead 507 through the first region 501*b*', and the second tab unit 501*c* of the first electrode sheet 501 is electrically connected to the tab lead 507 through the second region 501*c*'. The upper surface 510 and the lower surface 512 of the first tab unit 501*b* are provided with metal layers 514, and the upper surface 520 and the lower surface 522 of the second tab unit 501*c* are provided with metal layers 524. The first tab unit 501*b* is electrically connected to the tab lead 507 through the metal layer 514 arranged on the lower surface 512. The second tab unit 501*c* is electrically connected to the tab lead 507 through the metal layer 524 arranged on the lower surface 522. The first tab unit 501*b* and the second tab unit 501*c* are electrically connected through the metal layer 514 on the upper surface 510 of the first tab unit 501*b* and the metal layer 524 arranged on the lower surface 522 of the second tab unit 501*c*, so that the metal layer 514 of the first tab unit 501*b* is electrically connected to the tab lead 507 through the metal layer 524 of the second tab unit 501*c*. By analogy, the rest can be done in the same manner until the lower surface of the tab 501*a* farthest away from the external electrode sheet may be electrically connected to the tab lead 507. Therefore, the upper surface of the tab 501*a* farthest away from the external electrode sheet may be arranged not to include the metal layer.

According to the embodiments of the present application, different dimension designs and position arrangements are adopted for the tabs such that each of the plurality of tabs may be connected to the tab lead by welding or in any other appropriate manner, which improves the safety performance of a battery cell, meanwhile reduces the weight of the battery and ensures good conduction between each tab of the electrode sheet and the outside.

FIG. 8 shows a partial structure diagram of a battery cell 800 according to another embodiment of the present application. The difference from the battery cell 500 shown in FIG. 5 is that a second tab unit 801*c* of the battery cell 800 is beyond a first tab unit 801*b* in the length direction X of the battery cell 800. A configuration manner similar to that of the first tab unit 801*b* and second tab unit 801*c* described above is adopted for other tabs 801*a* in FIG. 8. In some embodiments of the present application, the intervals between the tabs 801*a* in the length direction X of the electrode sheet body 100 are designed such that the first tab unit 801*b* and the second tab unit 801*c* are arranged in a non-stacking form after the electrode sheet body 100 is wound into a wound structure in the length direction X. All of the tabs 801*a* in FIG. 8 are electrically connected to the tab lead in a manner similar to that described in FIG. 6.

In addition, the applicant conducts the following tests on batteries of each embodiment disclosed in the present application. The following 4 different embodiments provided according to the present application and one comparative embodiment according to the prior art are provided, and the impedance of each battery and welding resistance between a negative electrode tab of each battery and a tab lead are tested.

Embodiment 1

The positive current collector is composed of a polymer layer made of PET (polyethylene terephthalate, PET) with a thickness of about 12 um and a metal layer made of Al with a thickness of about 0.5 um. A positive electrode active material lithium cobalt oxide (LiCoO2), conductive carbon black (Super P) and polyvinylidene fluoride (PVDF) are mixed at a weight ratio of 97.5:1.0:1.5, N-methyl pyrrolidone (NMP) is added as a solvent to prepare slurry with the solid content of 0.75, and uniform stirring is performed. The positive electrode current collector is uniformly coated with the slurry with a about 15 cm blank region reserved on the edge of each of the two sides of the positive electrode current collector. After coating is completed, drying and cold pressing are performed. By adjusting the parameters of the laser die-cutting, the excess empty foil area is cut off, and an electrode sheet with five tabs that are 10 mm wide and about 14 mm, about 12 mm, about 10 mm, about 8 mm and about 6 mm long respectively is obtained.

A copper foil is used as a negative electrode current collector. A negative electrode active material including silicon-carbon, conductive carbon black (Super P) and a binder styrene butadiene rubber (SBR) are mixed at weight ratio of 95:1:4, de-ionized water is added, and uniform stirring is performed to obtain slurry with the solid content of 0.49. The negative electrode current collector is uniformly coated with the slurry with an about 15 cm blank region reserved on the edge of each of the two sides of the negative electrode current collector. After coating is completed, drying and cold pressing are performed. A superfluous blank foil region is cut by laser die-cutting to obtain an electrode sheet with five tabs that are about 10 mm wide and about 12 mm long.

An isolation film is additionally arranged between the obtained positive electrode sheet and negative electrode sheet, and a wound structure is obtained in a winding manner. The stacked negative electrode tabs are welded together with a tab lead, and transfer welding is performed on a plurality of layers of positive electrode tabs and the tab lead. Liquid injection and battery cell packaging are performed, and formation is performed to obtain a complete battery cell I.

Embodiment 2

The positive current collector is composed of a polymer layer made of PET with a thickness of about 12 um PET and a metal layer made of Al with a thickness of about 1.0 um. A positive electrode active material lithium cobalt oxide (LiCoO2), conductive carbon black (Super P) and polyvinylidene fluoride (PVDF) are mixed at a weight ratio of 97.5:1.0:1.5, N-methyl pyrrolidone (NMP) is added as a solvent to prepare slurry with the solid content of 0.75, and uniform stirring is performed. The positive electrode current collector is uniformly coated with the slurry with an about 15 cm blank region reserved on the edge of each of the two sides of the positive electrode current collector. After coating is completed, drying and cold pressing are performed. By adjusting the parameters of the laser die-cutting, the excess empty foil area is cut off, and an electrode sheet with five tabs that are about 10 mm wide and about 14 mm, about 12 mm, about 10 mm, about 8 mm and about 6 mm long respectively is obtained.

A copper foil is used as a negative electrode current collector. A negative electrode active material silicon-carbon, conductive carbon black (Super P) and a binder styrene butadiene rubber (SBR) are mixed at a weight ratio of 95:1:4, de-ionized water is added, and uniform stirring is performed to obtain slurry with the solid content of 0.49. The negative electrode current collector is uniformly coated with the slurry with an about 15 cm blank region reserved on the edge of each of the two sides of the negative electrode current collector. After coating is completed, drying and cold pressing are performed. A superfluous blank foil region is cut by laser die-cutting to obtain an electrode sheet with five tabs that are about 10 mm wide and about 12 mm long.

An isolation film is additionally arranged between the obtained positive electrode sheet and negative electrode sheet, and a wound structure is obtained in a winding manner. The stacked negative electrode tabs are welded together with a tab lead, and transfer welding is performed on a plurality of layers of positive electrode tabs and the tab lead. Liquid injection and battery cell packaging are performed, and formation is performed to obtain a complete battery cell II.

Embodiment 3

The positive current collector is composed of a polymer layer made of PET with a thickness of about 12 um PET and a metal layer made of Al with a thickness of about 0.5 um. A positive electrode active material lithium cobalt oxide (LiCoO2), conductive carbon black (Super P) and polyvinylidene fluoride (PVDF) are mixed at a weight ratio of 97.5:1.0:1.5, N-methyl pyrrolidone (NMP) is added as a solvent to prepare slurry with the solid content of 0.75, and uniform stirring is performed. The positive electrode current collector is uniformly coated with the slurry with about 15 cm blank region reserved on the edge of each of the two sides of the positive electrode current collector. After coating is completed, drying and cold pressing are performed. By adjusting the parameters of the laser die-cutting, the excess empty foil area is cut off, and an electrode sheet with five tabs that are about 10 mm wide and about 14 mm, about 13 mm, about 12 mm, about 11 mm and about 10 mm long respectively is obtained.

A copper foil is used as a negative electrode current collector. A negative electrode active material silicon-carbon, conductive carbon black (Super P) and a binder styrene butadiene rubber (SBR) are mixed at a weight ratio of 95:1:4, de-ionized water is added, and uniform stirring is performed to obtain slurry with the solid content of 0.49. The negative electrode current collector is uniformly coated with the slurry with an about 15 cm blank region reserved on the edge of each of the two sides of the negative electrode current collector. After coating is completed, drying and cold pressing are performed. A superfluous blank foil region is cut by laser die-cutting to obtain an electrode sheet with 5 tabs that are about 10 mm wide and about 12 mm long.

An isolation film is additionally arranged between the obtained positive electrode sheet and negative electrode sheet, and a wound structure is obtained in a winding manner. The stacked negative electrode tabs are welded together with a tab lead, and transfer welding is performed on a plurality of layers of positive electrode tabs and the tab lead. Liquid injection and battery cell packaging are performed, and formation is performed to obtain a complete battery cell III.

Embodiment 4

The positive current collector is composed of a polymer layer made of PET with a thickness of about 12 um PET and a metal layer made of Al with a thickness of about 0.5 um. A positive electrode active material lithium cobalt oxide (LiCoO2), conductive carbon black (Super P) and polyvinylidene fluoride (PVDF) are mixed at a weight ratio of 97.5:1.0:1.5, N-methyl pyrrolidone (NMP) is added as a solvent to prepare slurry with the solid content of 0.75, and uniform stirring is performed. The positive electrode current collector is uniformly coated with the slurry with about 15 cm blank region reserved on the edge of each of the two sides of the positive electrode current collector. After coating is completed, drying and cold pressing are performed. By adjusting the parameters of the laser die-cutting, the excess empty foil area is cut off, and an electrode sheet with five tabs that are about 12 mm wide and about 14 mm, about 12 mm, about 10 mm, about 8 mm and about 6 mm long respectively is obtained.

A copper foil is used as a negative electrode current collector. A negative electrode active material silicon-carbon, conductive carbon black (Super P) and a binder styrene butadiene rubber (SBR) are mixed at a weight ratio of 95:1:4, de-ionized water is added, and uniform stirring is performed to obtain slurry with the solid content of 0.49. The negative electrode current collector is uniformly coated with the slurry with an about 15 cm blank region reserved on the edge of each of the two sides of the negative electrode current collector. After coating is completed, drying and cold pressing are performed. A superfluous blank foil region is cut by laser die-cutting to obtain an electrode sheet with 5 tabs that are 10 mm wide and 12 mm long.

An isolation film is additionally arranged between the obtained positive electrode sheet and negative electrode sheet, and a wound structure is obtained in a winding manner. The stacked negative electrode tabs are welded together with a tab lead, and transfer welding is performed on a plurality of layers of positive electrode tabs and the tab lead. Liquid injection and battery cell packaging are performed, and formation is performed to obtain a complete battery cell IV.

Comparative Example 1

The positive current collector is composed of a polymer layer made of PET with a thickness of about 12 um PET and a metal layer made of Al with a thickness of about 0.5 um. A positive electrode active material lithium cobalt oxide (LiCoO2), conductive carbon black (Super P) and polyvinylidene fluoride (PVDF) are mixed at a weight ratio of 97.5:1.0:1.5, N-methyl pyrrolidone (NMP) is added as a solvent to prepare slurry with the solid content of 0.75, and uniform stirring is performed. The positive electrode current collector is uniformly coated with the slurry with about 15 cm blank region reserved on the edge of each of the two sides of the positive electrode current collector. After coating is completed, drying and cold pressing are performed. By adjusting the parameters of the laser die-cutting, the excess empty foil area is cut off, and an electrode sheet with five tabs that are about 10 mm wide and about 12 mm long respectively is obtained.

A copper foil is used as a negative electrode current collector. A negative electrode active material silicon-carbon, conductive carbon black (Super P) and a binder styrene butadiene rubber (SBR) are mixed at a weight ratio of 95:1:4, de-ionized water is added, and uniform stirring is performed to obtain slurry with the solid content of 0.49. The negative electrode current collector is uniformly coated with the slurry with an about 15 cm blank region reserved on the edge of each of the two sides of the negative electrode current collector. After coating is completed, drying and cold pressing are performed. A superfluous blank foil region is cut by laser die cutting to obtain an electrode sheet with five tabs that are about10 mm wide and about 12 mm long.

An isolation film is additionally arranged between the obtained positive electrode sheet and negative electrode sheet, and a wound structure is obtained in a winding manner. The stacked negative electrode tabs are welded together with a tab lead, and transfer welding is performed on a plurality of layers of positive electrode tabs and the tab lead. Liquid injection and battery cell packaging are performed, and formation is performed to obtain a complete battery cell V.

Tests on two aspects are conducted on the batteries of embodiments 1-4 and Comparative Example 1. First, the total battery impedance of the batteries of embodiments 1-4 and Comparative Example 1 are tested. The surface of the side, close to the tab lead, of the negative electrode tab is marked as surface A, and the surface of the side, far away from the tab lead, namely opposite to surface A, of the negative electrode tab is marked as surface B. Second, the negative electrode tabs are cut off from the main body of the electrode sheet, and welding resistance between each negative electrode tab and the tab lead is tested. Corresponding test results are listed in Table 1.

TABLE 1

Impedance Test Results of Batteries of Embodiments 1-4 and

| Group | Total battery impedance (mΩ) | Welding resistance between negative electrode tab and tab lead (m(2) | | | | | | | | | |
|---|---|---|---|---|---|---|---|---|---|---|---|
| | | Surface A of No. I negative electrode tab | Surface B of No. I negative electrode tab | Surface A of No. II negative electrode tab | Surface B of No. II negative electrode tab | Surface A of No. IIII negative electrode tab | Surface B of No. III negative electrode tab | Surface A of No. IV negative electrode tab | Surface B of No. IV negative electrode tab | Surface A of No. V negative electrode tab | Surface B of No. V negative electrode tab |
| Embodiment 1 | 38 | 60 | 71 | 68 | 79 | 76 | 88 | 82 | 95 | 90 | — |
| Embodiment 2 | 27 | 31 | 36 | 33 | 39 | 38 | 43 | 41 | 48 | 45 | — |
| Embodiment 3 | 58 | 61 | 130 | 128 | 156 | 150 | 175 | 167 | 201 | 190 | — |
| Embodiment 4 | 37 | 61 | 70 | 68 | 78 | 75 | 86 | 80 | 93 | 88 | — |
| Comparative Example 1 | 413 | 59 | — | — | — | — | — | — | — | — | — |

In the table, "—" represents that the impedance exceeds the measuring span and it may be considered that no electron conduction occurs.

From the table, it can be seen that the total battery impedance of the battery provided according to the present application is far lower than the total battery impedance of the battery provided in the prior art. Moreover, it can be seen from Table 1 that for the battery adopting a multi-tab structure design in the prior art, only the A surface of the negative electrode tab directly contacting the tab lead has electron conduction, and the surfaces of the remaining tabs are free of electron conduction. However, in the battery provided in the embodiments of the present application, except the surface B of the negative electrode tabs farthest away from the tab lead, other negative electrode tabs all have electron conduction on their surfaces A and surfaces B. Therefore, the electrode sheet and the battery cell provided in the embodiments of the present application can reduce the weight of the battery while improving the safety performance of the battery, and ensure that each of the tabs in the electrode sheet can be electrically conducted well with the outside.

The technical contents and technical features of the present application have been disclosed above. However, those skilled in the art may still make replacements and modifications on the basis of the demonstrations and disclosure of the present application without departing from the spirit of the present application. Therefore, the scope of protection of the present application should not be limited to the contents disclosed in the embodiments and, instead, should include various replacements and modifications made without departing from the present application and be covered by the claims of the present application.

What is claimed is:

1. A battery cell, comprising an electrode assembly formed by winding a first electrode sheet and a second electrode sheet; wherein the first electrode sheet and the second electrode sheet are spaced apart from each other, wherein an isolation film is sandwiched between the first electrode sheet and the second electrode sheet; wherein the first electrode sheet comprises:

an electrode sheet body, having a length direction and a width direction perpendicular to the length direction; and a plurality of tabs connected to the electrode sheet body, the plurality of tabs extend away from the electrode sheet body along the width direction, each of the plurality of tabs having a width in the width direction and a length in the length direction;

wherein the length of each of the plurality of tabs is different from one another; wherein a difference between lengths of every two adjacent tabs of the plurality of tabs ranges from 2.0 millimeters to 5.0 millimeters; and, the plurality of tabs of the first electrode sheet comprises a first tab unit and a second tab unit, the second tab unit extends beyond the first tab unit in the length direction of the battery cell;

wherein the electrode sheet body comprises a current collector and an active material layer located on a surface of the current collector, the current collector comprises a first polymer layer and a first metal layer located on each of two opposite surfaces of the first polymer layer;

wherein each of the plurality of tabs comprises a second polymer layer and a second metal layer located on a surface of the second polymer layer;

wherein the surface of the second polymer layer comprises a first surface and a second surface opposite to the first surface, wherein one of the first surface and the second surface is not provided with any metal layer.

2. The battery cell according to claim 1, wherein the first tab unit and the second tab unit in the electrode assembly are stacked on one another or spaced apart from each other.

3. The battery cell according to claim 2, wherein the lengths of the plurality of tabs are sequentially configured in the length direction according to an arithmetic progression.

4. The battery cell according to claim 1, further comprising a tab lead, wherein the plurality of tabs of the first electrode sheet are electrically connected to the tab lead.

5. The battery cell according to claim 4, wherein the first tab unit is electrically connected to the tab lead through a first region and the second tab unit is electrically connected to the tab lead through a second region, wherein the first region is closer to a main body of the electrode assembly than the second region.

6. The battery cell according to claim 1, wherein the second tab unit extends beyond the first tab unit in the width direction of the battery cell.

7. The battery cell according to claim 1, wherein the first metal layer has a thickness of about 2 microns to smaller than 10 microns.

* * * * *